Jan. 23, 1968 　　　J. C. JUREIT 　　　3,365,221
METAL SHEATHED NON-SKID FLOORING ASSEMBLAGE
Filed Dec. 3, 1964 　　　2 Sheets-Sheet 1
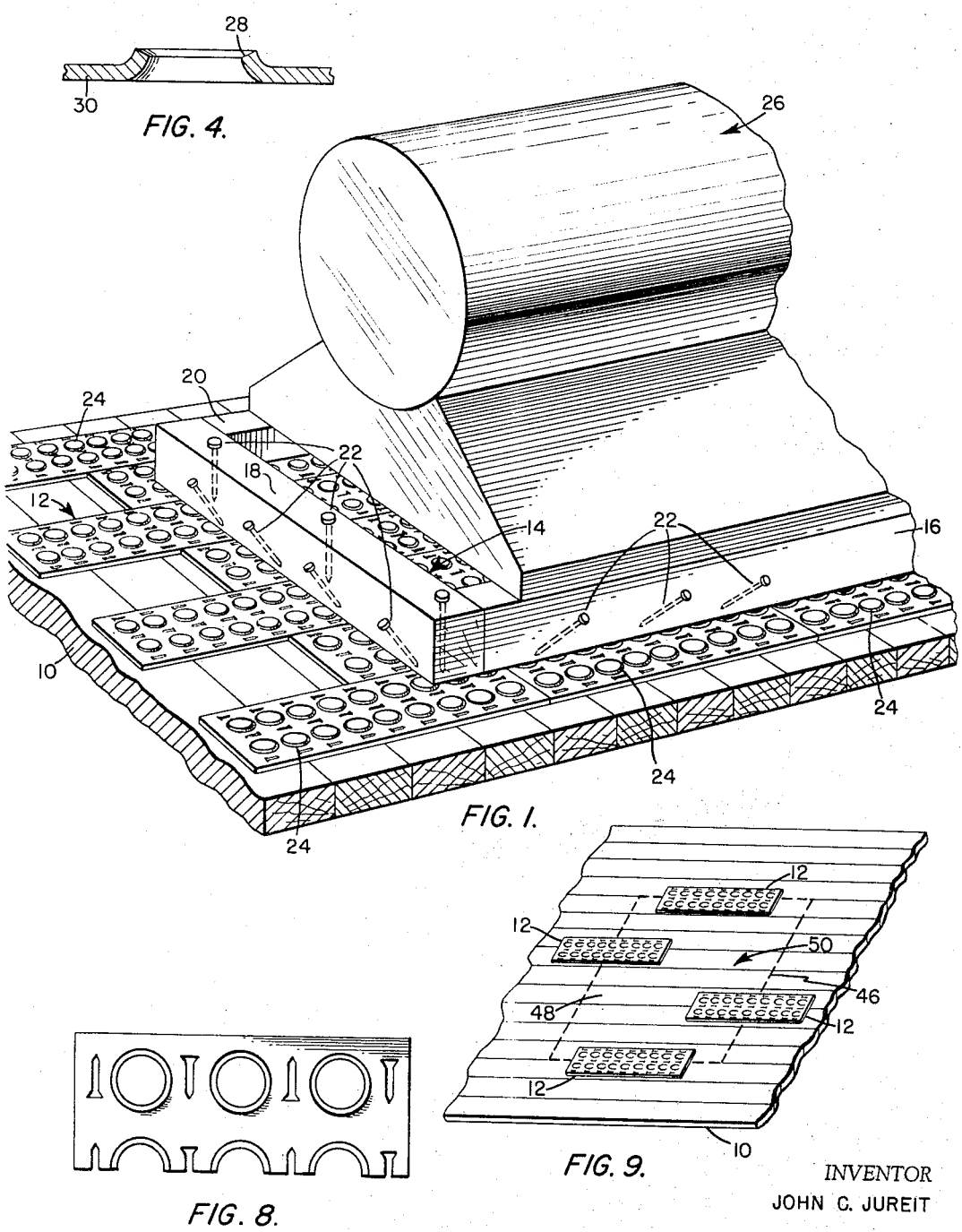
INVENTOR
JOHN C. JUREIT
BY *LeBlanc & Shur*
ATTORNEY Jan. 23, 1968     J. C. JUREIT     3,365,221
METAL SHEATHED NON-SKID FLOORING ASSEMBLAGE
Filed Dec. 3, 1964     2 Sheets-Sheet 2
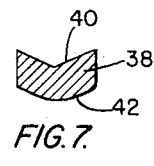
FIG. 7.
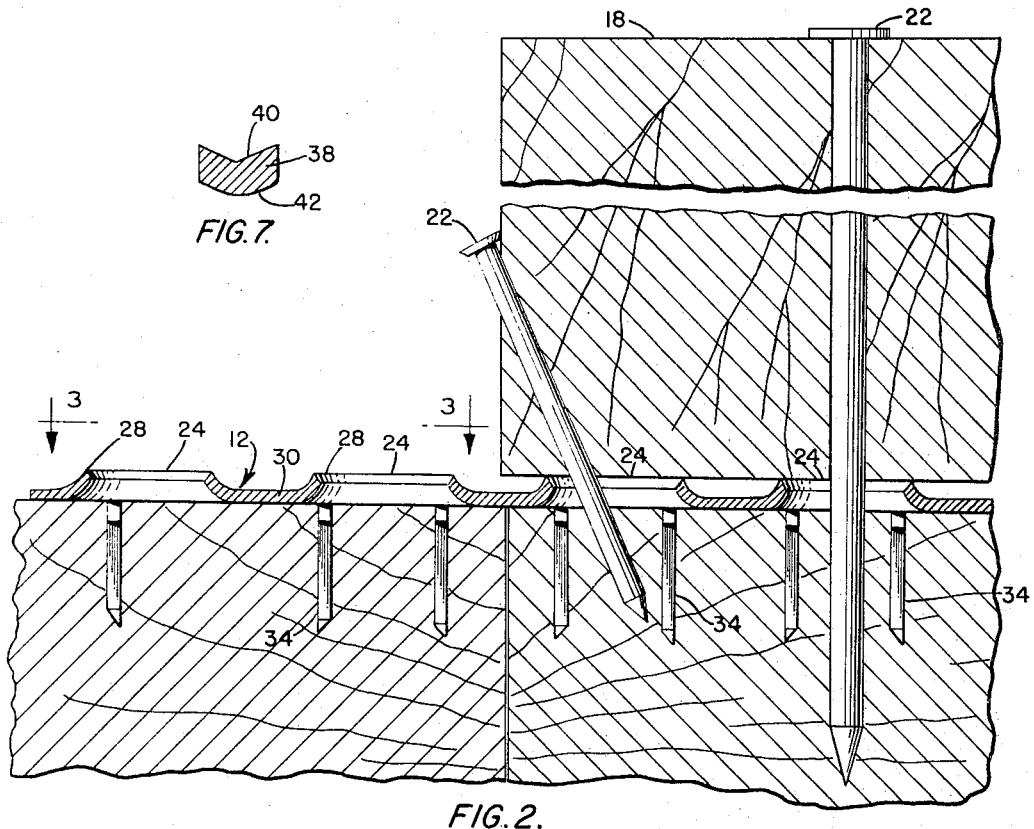
FIG. 2.
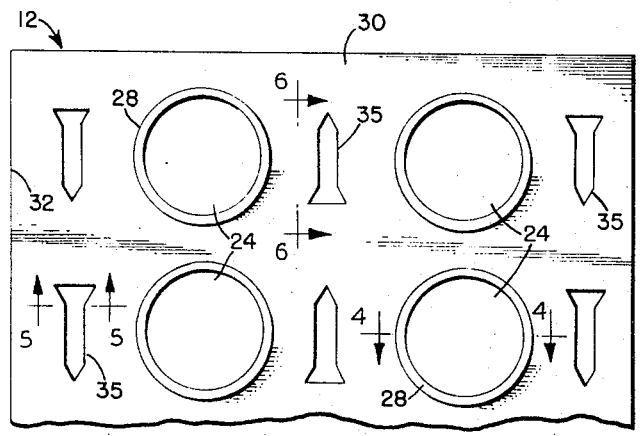
FIG. 3.
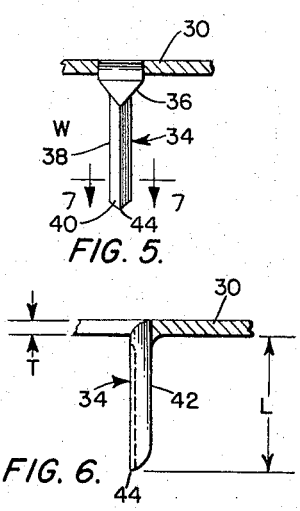
FIG. 5.
FIG. 6.
INVENTOR
JOHN C. JUREIT
BY *LeBlanc & Shur*
ATTORNEY

United States Patent Office 3,365,221
Patented Jan. 23, 1968

3,365,221
METAL SHEATHED NON-SKID FLOORING ASSEMBLAGE
John C. Jureit, Miami, Fla., assignor to Automated Building Components, Inc., Miami, Fla., a corporation of Florida
Filed Dec. 3, 1964, Ser. No. 415,582
7 Claims. (Cl. 287—20.92)

ABSTRACT OF THE DISCLOSURE

The metal sheathed non-skid flooring and blocking assemblage comprises a sheet metal plate having a plurality of spaced nail-like teeth struck therefrom for embedment into a wooden flooring. A plurality of circular openings are formed through the plate and have raised edges bent from the plate in a direction opposite to the teeth to provide a non-skid surface. The circular openings and teeth are arranged in alternate rows. A blocking member overlies the sheet resting on the raised circular edges of the openings and is secured to the floor by nails passing through the member and openings into the floor.

Background of the invention

This invention relates to an improved metal protective plate and more particularly to an improved metal protective plate non-skid flooring assemblage for prolonging the life of wooden flooring used in various industrial environments.

For years industry has been concerned with the problem of protecting and prolonging the life of wooden flooring subject to heavy industrial traffic and wear. For example, the wooden flooring used in railroad freight cars is continuously abraded and worn by the cargo or freight being dragged across it during loading and unloading, by the traffic of forklift and other materials-handling vehicles moving over it, and by the sliding and jostling of the freight during the humping operation.

Moreover, during transit it is common practice to secure freight to the wooden flooring by the use of blocking, strapping, or dunnage that is nailed directly to the flooring. When the freight reaches its destination, the nails are pulled from the flooring and the blocking, etc. is removed. Quite obviously, this repeated insertion and removal of nails has an additional deleterious effect on the life of the flooring. As a result, it is not surprising that before long, running splits are formed in the wooden flooring and the wood fibers thereof separate and splinter, thus necessitating expensive and time-consuming repairs and periodic replacement of the flooring.

In the past, industry has attempted to alleviate this long-standing problem by various means, including covering the wooden flooring with metal plates. These plates were secured to the wooden flooring by various means, among which were nails, bolts, and flanges which were formed on the plates and which fit between the cracks and/or along the edges of the flooring. While these plates satisfactorily protected the flooring, they had to be installed by relatively skilled workmen and the installation was time consuming. As a consequence, the cost of protecting wooden flooring by such plates is high and almost prohibitive.

Accordingly, it is the primary object of this invention to provide an improved metal protective plate for protecting and covering wooden flooring and the like, that can be installed inexpensively and conveniently by relatively unskilled workmen. To accomplish this object, the protective plate of this invention has a plurality of integral nail-like teeth projecting from one side of the plate and forming the sole means of securing the plate to the flooring. Additionally, these nails or teeth also bind the fibers of the flooring together so as to prevent the formation of running splits caused, for example, by the use of nailed blocking, strapping, and dunnage. A related object of this invention is to provide an improved, metal protective plate which may be simultaneously utilized as a connector to secure the boards of a wooden flooring together, particularly in the situation where a badly damaged section of the flooring has been entirely cut out and replaced by new boards.

It is a further object of this invention to provide an improved metal protective plate having a plurality of circular openings formed therein which, in addition to providing nailing points for the blocking, strapping, dunnage, and the like, have raised edges which offer traction to workmen and materials-handling vehicles, thus eliminating the need for applying a friction coating to the plates.

It is another object of this invention to provide an improved metal protective plate that is economical to manufacture with a minimum of metal wastage.

These and further objects and advantages of this invention will become apparent on reference to the following specification, claims, and drawings, wherein:

FIGURE 1 is an elevation view of a wooden flooring having a plurality of metal protective plates of this invention installed thereon, and further showing wooden blocking nailed to the flooring to secure freight.

FIGURE 2 is a vertical section on a longitudinal axis of one of the protective plates of this invention, showing the plate installed in a wooden floor, and also showing a portion of the blocking nailed to the floor through the openings in the plate.

FIGURE 3 is a partial plan view of the plate taken along line 3—3 of FIGURE 2.

FIGURE 4 is a vertical section view of a portion of a plate taken along line 4—4 of FIGURE 3, showing the details of one of the openings formed in the plate.

FIGURE 5 is a vertical section view of a portion of a plate taken along line 5—5 of FIGURE 3, showing the details of a single tooth.

FIGURE 6 is a vertical section view of a portion of a plate taken along line 6—6 of FIGURE 3.

FIGURE 7 is a horizontal section view of a single tooth taken along line 7—7 of FIGURE 5.

FIGURE 8 is a partial plan view of a modified protective plate of this invention that is wider than the plate shown in FIGURE 3.

FIGURE 9 is a diagrammatic view of a wooden flooring in which a central section (shown bounded by the dotted line) has been repaired by the removal of the worn boards and the installation of new boards that are secured to the flooring by the protective plates of this invention.

Referring now to FIGURE 1, there is shown, generally indicated at 10, a wooden flooring that is subject to heavy industrial traffic and wear, such as found, for example, in a railroad freight car. The upper surface of the flooring 10 is completely covered by a plurality of the improved metal protective plates 12 of this invention. The blocking 14, consisting of timbers 16, 18 and 20, is fastened to the flooring 10 by means of a number of nails or spikes 22 that pass through the circular openings 24 formed in the plates, and is utilized to prevent the freight, shown diagrammatically at 26, from moving or sliding on the flooring during transit.

In FIGURE 2, one of the plates 12 is shown wherein the timber 18 is fastened to the flooring 10 by the nails or spikes 22 that pass through the openings 24 in the plate 12.

As more clearly shown in FIGURES 2 and 3, each plate 12 has a number of equal diameter openings 24 that are formed in its body 30 by a punching operation. These openings 24 are surrounded by upwardly projecting edges 28 which are formed by bending or flaring the metal sheet that forms the body 30 of the plates 12, either after but preferably in the same operation wherein the openings 24 are punched therein. The edges 28 provide non-slip traction for both the workmen and the materials-handling vehicles and obviate the necessity of covering the upper surfaces of the plates 12 with a friction coating.

The openings 24 are formed in two longitudinal rows; each row being spaced in from the sides 32 of the plate approximately one-third of the width of the plate, and the distance between the edges 28 of the longitudinally adjacent openings 24 is approximately equal to the length of the radius of the openings 28.

In addition to the openings 24, each plate 12 also includes a plurality of integral, downwardly depending nail-like teeth 34. These teeth 34 are slender, elongated, and nail-like and are so arranged that they provide fully adequate withdrawal resistance to permit them to serve as the sole means of fastening the plates 12 to the wooden flooring 10. All the teeth are substantially identical and are punched or struck from the body 30 of the plates 12 in three longitudinal rows, thus leaving a like number of rows of elongated slots 35 in the body 30. In each row of slots 35, the individual slots are spaced longitudinally from each other a distance slightly greater than the length of a single tooth. The two end rows of teeth 34 and slots 35 are spaced equidistant between the two rows of openings 24. The teeth in the two end rows are punched or struck from the body 30 so that all the teeth face in one direction; whereas the teeth in the center row are punched or struck from the body 30 so that they face in the opposite direction.

Referring now to FIGURES 5, 6, and 7, each of the teeth 34 include a generally triangular-shaped shoulder 36 and a shank portion 38. As shown in FIGURE 7, the shank portion 38 has a concave punch face 40 which is formed by the punch when the teeth are struck from the body 30 during the plate-manufacturing operation and a convex back face 42. In order for the teeth to properly fasten the plate to the flooring, the teeth shanks terminate in pointed ends, which are shown in FIGURES 5 and 6 as chisel-pointed ends 44. While other types of pointed ends may, of course, be utilized, such as scarf-pointed ends or rounded points, the chisel points are preferred.

In a preferred illustrative embodiment of this invention, the plates 12 are made from steel plate and have a length of approximately 1 foot, a width of approximately 4 3/16 inches, and a thickness of approximately 0.075 inch. The diameter of each of the openings 24 (measured between the edges 28) is approximately 13/16 inch. The openings 24 and teeth 34 are arranged and spaced such that there are ten openings and teeth per row per foot of plate. The length "L" (as shown in FIGURE 6) of the teeth 34 is approximately 11/16 inch and the shank portion 38 of the teeth has a width "W" (as shown in FIGURE 5) of approximately 1/8 inch.

Of course, the plates 12, the teeth 34, and openings 24 may have other dimensions, the above dimensions being illustrative of a preferred embodiment. For example, the plates may be 8 or 10 feet long and the plate may be wider so as to accommodate an extra row of openings and teeth, such as shown in FIGURE 8.

As mentioned above, the plate 12 of this invention can be installed conveniently by relatively unskilled laborers. By simply using hand hammers or, preferably, relatively large pneumatic hammers, such as the type used for breaking concrete pavement, the plates can be quickly fastened to the flooring. When pneumatic hammers are used in this manner, a flat plate is fastened to the driving tool to act as the hammer head.

Normally, when the plates 12 are used to cover older, existing flooring, they are installed perpendicular to the planks in the flooring, since this tends to compress the planks and the wooden fibers together. However, the plates may be installed parallel to the planks, particularly when used to cover new flooring, and, in this instance, the length of the plates may be increased so that one plate extends the full length of each individual plank.

Moreover, as shown in FIGURE 9, the plates 12 may also be simultaneously utilized as connectors to secure or hold new boards which have been used to replace damaged boards to the rest of the flooring. Oftentimes in a badly damaged area of a railroad car floor, a section of the floor will be cut out entirely and completely replaced by a plurality of new boards. The plates 12 may be then installed so that they overlap the joints (shown by the dotted line 46) between the old boards and the new boards 48 used to repair the damaged area or section 50 of the flooring 10. Thus these protective plates 12 are utilized both to hold the replacement boards in place and also to protect the flooring against abrasion.

With regard to FIGURE 9, and for that matter FIGURE 1, it should be noted that in normal usage the entire flooring 10 would be completely covered and protected by the plates 12; however, in the interest of clarity, all of the plates were not shown in these figures.

It will be apparent from the foregoing that the metal protective plate of this invention is economical to manufacture and may be installed quickly and conveniently by relatively unskilled laborers since the sole means for securing the plate to the flooring is formed integrally with the plate. Moreover, this plate not only protects wooden flooring from deterioration due to heavy traffic and wear, but also tends to bind the wood fibers in the flooring together, so as to prevent the formation of running splits. In addition, the metal protective plate of this invention has a plurality of circular openings which provide nailing points for securing blocking, strapping, and dunnage to the flooring, and also has raised edges surrounding these openings which offer traction for the workmen and materials-handling vehicles.

While the metal protective plate of this invention has been disclosed for use in protecting the wooden flooring in railroad freight cars, the plates, of course, can be used to protect other industrial flooring, such as that found in the flatbeds of trucks, ramps, shipping docks, warehouse areas, and the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. Metal sheathed non-skid flooring and blocking assemblage comprising: wooden flooring and at least one protective plate comprising a flat metal sheet having a plurality of spaced nail-like teeth struck therefrom leaving a plurality of slots therein, said teeth extending from one surface thereof embedded in said wooden flooring in a nail-like manner to provide adequate withdrawal resistance to enable said teeth to serve as the sole means of fastening said metal sheet to said wooden flooring, said metal sheet having a plurality of spaced openings formed therein and spaced between said slots, said openings having raised edges bent from said sheet in a direction opposite to said teeth and of a length considerably shorter than said teeth to provide a non-skid surface on the opposite surface of said metal sheet from which said teeth extend into said wooden flooring, said openings being substantially circular and of a diameter considerably larger than the width of the teeth, a blocking member overlying said sheet and resting on said raised edges, and nail-like fastening means passing through said openings into said flooring joining said blocking member to said flooring.

2. The device described in claim 1 wherein the teeth of said metal sheet enter at least two butted wooden members forming a portion of said flooring.

3. The device according to claim 1 wherein said openings are of a diameter larger than the length of said teeth.

4. The device described in claim 1 in which said teeth and said openings are arranged in spaced rows.

5. The device described in claim 4 in which said teeth and said openings are arranged in spaced alternate rows of teeth and openings extending substantially parallel to the longitudinal axis of the plate.

6. The device described in claim 5 in which the teeth are struck from said body so that the teeth in one row face in one direction and the teeth in the adjacent row face in the opposite direction.

7. The device described in claim 5 in which said teeth are formed with a nail-like shank attached to the plate by a shoulder of increased cross section, the shank having a substantially V-shaped cross section and terminating in a point.

References Cited

UNITED STATES PATENTS

| | | | |
|---|---|---|---|
| 999,828 | 8/1911 | McNaughton | 248—119 |
| 1,496,961 | 6/1924 | Welsch | 248—346 |
| 2,089,550 | 8/1937 | Hacker. | |
| 2,726,419 | 12/1955 | Saks. | |
| 2,885,749 | 5/1959 | Jureit | 287—20.92 |
| 3,011,226 | 12/1961 | Menge | 85—13 |
| 3,016,586 | 1/1962 | Atkins | 287—20.92 |
| 3,234,841 | 2/1966 | Adams | 85—13 |

FOREIGN PATENTS

| | | |
|---|---|---|
| 460,054 | 1937 | Great Britain. |
| 31,120 | 1904 | Switzerland. |

FRANK L. ABBOTT, *Primary Examiner.*

R. A. STENZEL, *Assistant Examiner.*